US012436873B2

(12) United States Patent
Samal et al.

(10) Patent No.: US 12,436,873 B2
(45) Date of Patent: Oct. 7, 2025

(54) SYSTEMS AND METHODS FOR GLOBAL AUTOMATION AND TESTING SERVICES (71) Applicant: Fidelity Information Services, LLC, Jacksonville, FL (US)

(72) Inventors: Saswata K. Samal, Bhubaneswar (IN); Preeti Padalia, Bangalore (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 17/176,386

(22) Filed: Feb. 16, 2021

(65) Prior Publication Data
US 2022/0206932 A1 Jun. 30, 2022

(30) Foreign Application Priority Data
Dec. 31, 2020 (IN) .............. 202011057392

(51) Int. Cl.
G06F 11/3668 (2025.01)
G06F 11/3698 (2025.01)

(52) U.S. Cl.
CPC ...... G06F 11/3688 (2013.01); G06F 11/3684 (2013.01); G06F 11/3698 (2025.01)

(58) Field of Classification Search
CPC .......................................... G06F 11/36–3698
See application file for complete search history.

(56) References Cited

U.S. PATENT DOCUMENTS

| | | | | |
|---|---|---|---|---|
| 5,564,004 A * | 10/1996 | Grossman | ............. | G06F 3/0481 715/811 |
| 7,712,073 B1 * | 5/2010 | Srinivasan | ................ | G06F 8/10 717/104 |
| 8,103,913 B2 * | 1/2012 | Zambrana | ........... | G06F 11/3612 714/38.1 |
| 8,145,726 B1 * | 3/2012 | Roche | ................. | G06F 11/3688 709/219 |
| 8,239,826 B2 * | 8/2012 | Elenburg | ............ | G06F 11/3688 717/110 |
| 8,533,676 B2 * | 9/2013 | Watters | ..................... | G06F 8/71 717/120 |
| 8,719,776 B2 * | 5/2014 | Eteminan | .................. | G06F 8/34 717/124 |
| 8,719,795 B2 * | 5/2014 | Bokhari | ............. | G06F 11/3688 717/127 |
| 9,117,028 B2 * | 8/2015 | Norton | ................ | G06F 11/3684 |
| 9,195,456 B2 * | 11/2015 | Sayers | ..................... | G06F 8/70 |

(Continued)

OTHER PUBLICATIONS

Lyon, G., Nmap Nework Scanning, nmap.org [online], Sep. 2020 [retrieved Sep. 18, 2021], Retrieved from Internet: <URL: https://web.archive.org/web/20200922014646/https://nmap.org/book/nse-usage.html>, Chapter 9, whole document.*

Primary Examiner — Todd Aguilera
(74) Attorney, Agent, or Firm — Finnegan, Henderson, Farabow, Garrett & Dunner, LLP (57) ABSTRACT Systems and methods are provided for implementing an automation testing framework capable of performing a plurality of automation tests. Systems and methods for ensuring cross-platform compatibility across automation testing applications are disclosed. A user interface is disclosed in which a user may select one of a plurality of scripting methods. Each scripting method corresponds to automation testing scripts. A standard file format is used to ensure cross-platform and cross-application compatibility.

18 Claims, 8 Drawing Sheets (56) References Cited

U.S. PATENT DOCUMENTS

| | | | | |
|---|---|---|---|---|
| 9,448,915 B2* | 9/2016 | Brown | ............... | G06F 11/3672 |
| 9,690,452 B2* | 6/2017 | Seliger | ................. | G06F 3/0481 |
| 9,715,483 B2* | 7/2017 | Lau | ........................ | G06F 8/38 |
| 10,089,217 B2* | 10/2018 | Best | .................... | G06F 11/3692 |
| 11,687,427 B2* | 6/2023 | Daniali | ............... | H04N 13/332 |
| | | | | 714/28 |
| 2003/0046029 A1* | 3/2003 | Wiener | .............. | G06F 11/3672 |
| | | | | 702/186 |
| 2006/0253742 A1* | 11/2006 | Elenburg | ........... | G06F 11/3688 |
| | | | | 714/E11.193 |
| 2008/0270998 A1* | 10/2008 | Zambrana | .......... | G06F 11/3612 |
| | | | | 717/131 |
| 2011/0161912 A1* | 6/2011 | Eteminan | ................. | G06F 8/34 |
| | | | | 717/124 |
| 2012/0072823 A1* | 3/2012 | Lau | .................... | G06F 11/3684 |
| | | | | 715/234 |
| 2012/0266136 A1* | 10/2012 | Brown | ............... | G06F 11/3672 |
| | | | | 717/124 |
| 2012/0266142 A1* | 10/2012 | Bokhari | ............. | G06F 11/3688 |
| | | | | 717/127 |
| 2013/0159974 A1* | 6/2013 | Norton | ............... | G06F 11/3684 |
| | | | | 717/124 |
| 2013/0174117 A1* | 7/2013 | Watters | ..................... | G06F 8/71 |
| | | | | 717/106 |
| 2013/0246904 A1* | 9/2013 | Seliger | ................. | G06F 3/0484 |
| | | | | 715/234 |
| 2014/0325476 A1* | 10/2014 | Sayers | ................... | G06F 8/427 |
| | | | | 717/115 |
| 2015/0106791 A1* | 4/2015 | Karuppiah | ......... | G06F 11/3688 |
| | | | | 717/127 |
| 2016/0085663 A1* | 3/2016 | Best | ................... | G06F 11/3684 |
| | | | | 714/38.1 |
| 2021/0311844 A1* | 10/2021 | Daniali | .............. | G06F 11/3419 |

\* cited by examiner

SYSTEMS AND METHODS FOR GLOBAL AUTOMATION AND TESTING SERVICES

CROSS-REFERENCE TO RELATED APPLICATION

This application claims priority to Indian Patent Application No. 202011057392, filed on Dec. 31, 2020, the content of which is incorporated by reference herein in its entirety.

TECHNICAL FIELD

The present disclosure generally relates to computerized systems and methods for implementing global automation and testing services. In particular, embodiments of the present disclosure relate to inventive and unconventional systems for integrating various service modules into a customer system.

BACKGROUND

Current automation services require scripts to be executed regularly using different methodologies suitable only for a specific automation context or use. Likewise, automation frameworks often target only a single user base. As a result, persons or entities implementing automation services across multiple databases must also implement multiple corresponding automation frameworks. Such implementations can be cumbersome, lead to cost and processing inefficiencies, require customized compatibility tools, and are often inaccessible except to the most experienced users.

Current automation frameworks, whether implemented alone or in connection with other frameworks, often require users to understand specialized programming syntax. This limits accessibility to the framework for the users who might actually most frequently interact with it, such as a company's employees untrained in programming and manual framework testers. Automation framework implementers are thus often forced to hire trained professionals or conduct their own training. In either instance, implementers must invest significant time and resources for optimal utilization of their automation systems.

SUMMARY

Embodiments of the present disclosure are directed to systems and methods for enabling global automation testing and services. An example method comprises providing a user with a plurality of scripting selections and receiving from the user a selection of one of the plurality of scripting selections. The method then comprises performing a plurality of automation tests with a plurality of automation applications, combining test data for performing the plurality of automation tests into a standard format, and exporting result data from the plurality of automation tests in the standard format.

Systems and computer-readable media (such as non-transitory computer-readable media) that implement the above method are also provided.

Additional objects and advantages of the embodiments will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to various embodiments, examples of which are illustrated in the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
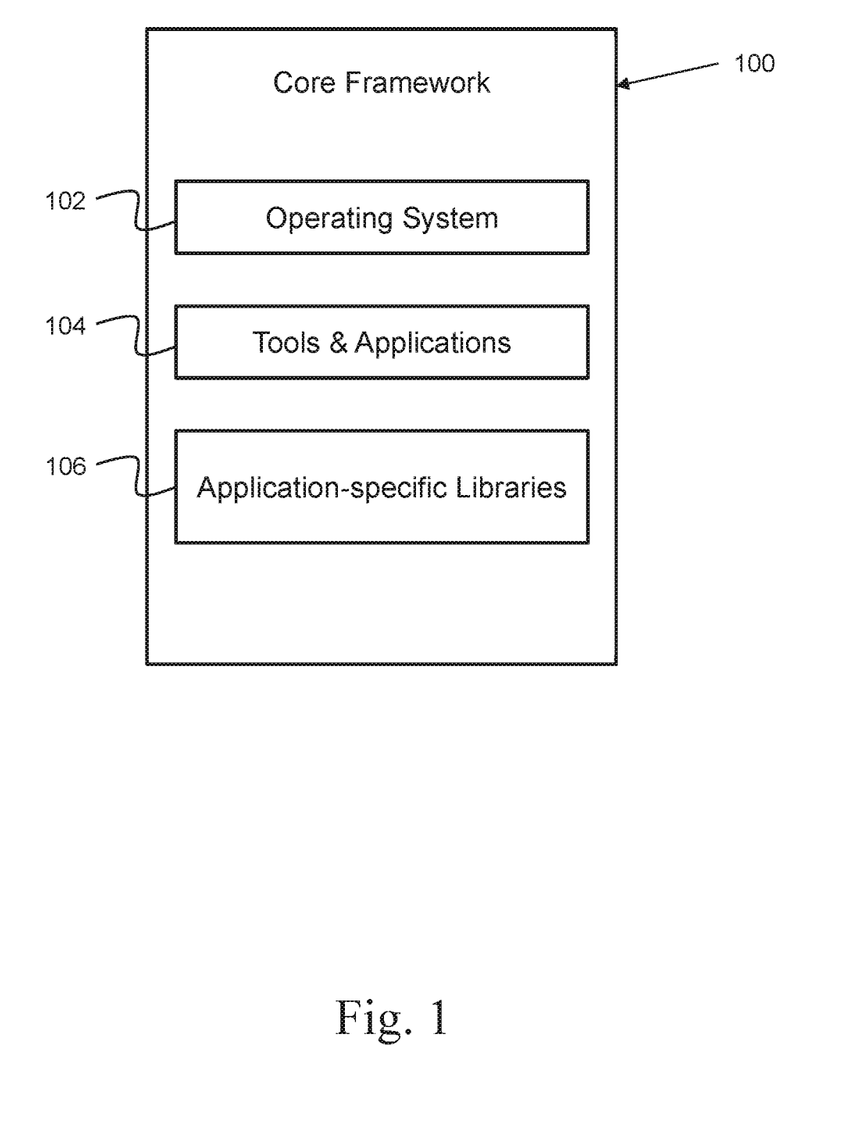
FIG. 1 illustrates a core framework under an embodiment of the present invention.

FIG. 1 illustrates a core framework 100 for use in implementing disclosed embodiments of the present invention. Core framework 100 comprises operating system 102, tools and applications 104, and application-specific libraries 106. Core framework 100 represents a computerized system architecture for implementing automation and testing services. The core framework 100 operates on one or more computer systems, with each computer system including at least a processor and a non-transitory memory. In some embodiments, a single computer system may store the data required to implement core framework 100, with a single processor for accessing said memory. Such a consolidated computer system may be preferable for implementations of the invention described hereafter in which economic and power costs must be minimized and the computational demands do not exceed that of a single commercially available processor. In some embodiments, core framework 100 may store data of the core framework 100 in the memory of a plurality of computer systems, and/or execute computer-readable programs associated with core framework 100 using a plurality of processors.

The operating system 102 of the core framework 100 is a software system that supports the framework's basic functions. One of ordinary skill will understand that many named and yet unnamed operating systems 102 can be used in core framework 100. As a non-limiting example of suitable commercially available systems, operating system 102 may include WINDOWS, MACINTOSH, IOS, NETWARE, UNIX, LINUX, ANDROID, UBUNTU, SOLARIS, and CHROME OS, among others.

One of ordinary skill will understand that many software tools and/or applications currently known can be used as tools and applications 104 in the core framework 100. For example, tools and applications 104 can include automation tools such as optical character recognition, image recognition, file format conversion, form field recognition, form creation and filling, software build stability testing, web element interaction testing, web page stability testing, functional web application testing, and cross-platform testing. One of ordinary skill will further understand that automation tools and applications developed on a future date may likewise fit under the description of tools and applications 104 insofar as they can be implemented as part of the core framework 100 as disclosed herein. The core framework 100 includes application-specific libraries 106 corresponding to implemented tools and applications 104. On a fundamental level, automation tools fitting under the description of tools and applications 104 can be understood to be executable scripts.

Core framework 100 is one portion of a global automation and testing system which will be disclosed in greater detail hereafter. As an introductory matter, the global automation and testing system of the present invention performs various types of automation testing. Each of the frameworks, layers, modules, methods, and architectures disclosed hereafter are likewise portions of the global automation and testing system in one or more embodiments as described. In each instance, these portions of the global automation and testing system may be understood as executable software functions or features, each stored in a memory as instructions executable by a processor. The global automation and testing system is implemented on one or more computers. One of skill in the art will understand that various economic factors, facility constraints, network connection availability factors, and use cases will impact whether each portion of the global automation and testing system as disclosed hereafter may be optimally implemented in a single computer system or in more than one computer system. In each instance, the global automation and testing system stores, executes, accesses, and/or runs each portion of the system using the one or more computers on which the system is implemented.

The global automation and testing system may conduct automation tests for image-based automation, optical character recognition-based automation, object position-based identification, object relationship-based identification, and dynamic-link library (DLL) injection.

Under image-based automation, the global automation and testing system may expose an application programming interface (API) to perform one or more actions on objects with images as the object properties. This approach can be used if any object is unidentifiable or cannot be identified uniquely and there is no dynamic data associated with the object.

Under optical character recognition-based automation, the global automation and testing system may search and identify characters of text when an object is unidentifiable and cannot be automated with image-based automation or other automation options.

Under position-based identification, the global automation and testing system may identify objects which are not uniquely identifiable alone, but may be identified by their neighboring objects which are identifiable. Similarly, under object relationship-based identification, objects which are not uniquely identifiable alone may be identified by related objects which are identifiable.

Under DLL injection automation, the global automation and testing system may identify objects which are not identifiable but are developed using dotnet form technology. A DLL can be injected in a running application and become a bridge between the application and the global automation and testing system. Using that bridge, the global automation and testing system can communicate to get data and perform actions in the application accurately.

Figure 2:
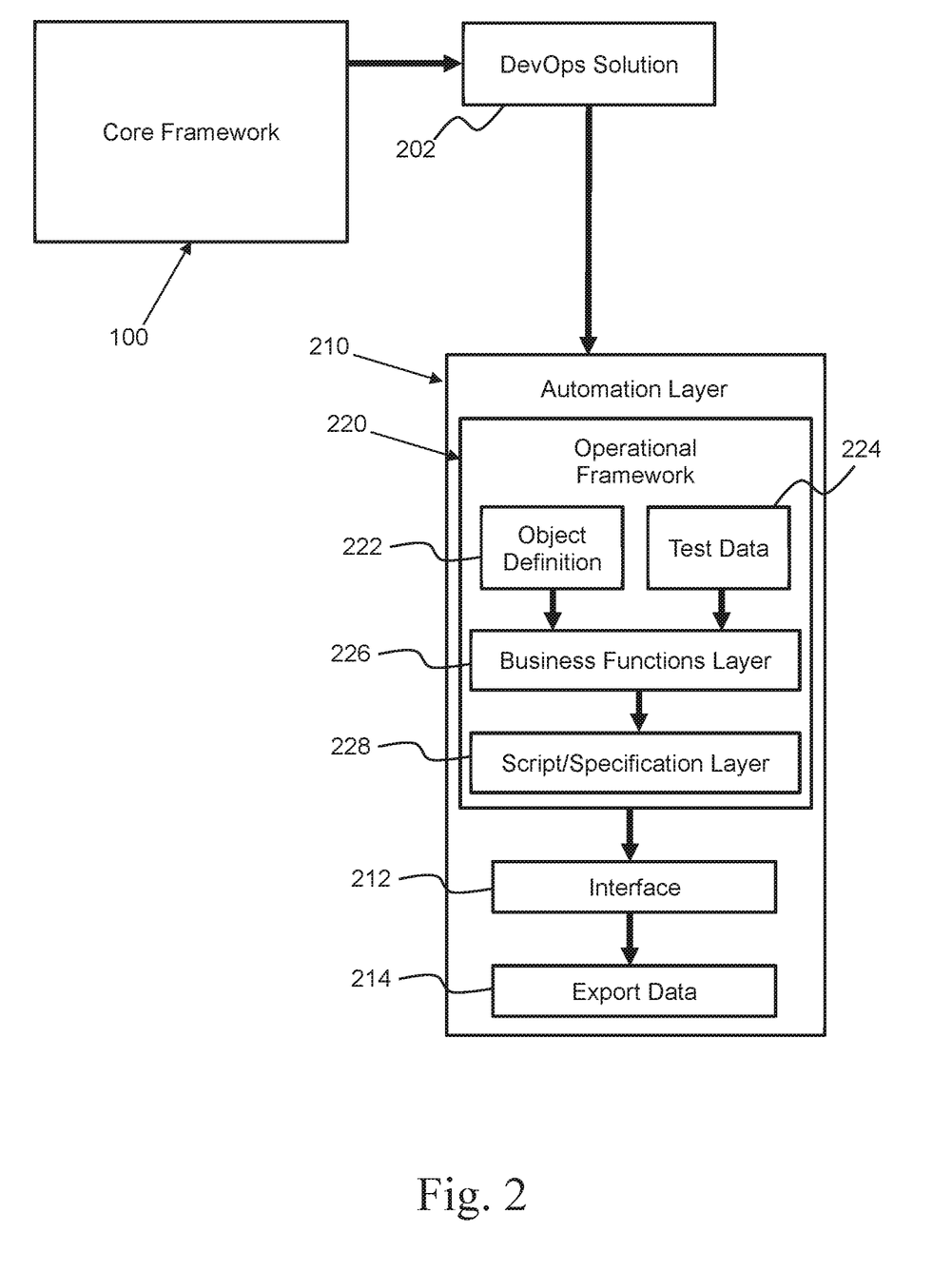
FIG. 2 illustrates a core framework and automation layer of an embodiment of the present invention.

FIG. 2 illustrates a core framework 100 implemented together with an automation layer 210 in an embodiment of the present invention. The core framework 100 communicates with development and operations ("DevOps") solution 202. DevOps solution 202 communicates with automation layer 210. Automation layer 210 includes operational framework 220, which passes data to interface 212. Export data 214 is produced based on inputs received through interface 212. Operational framework 220 further includes object definition 222 and test data 224, each in communication with a business functions layer 226. Business functions layer 226 passes data to script or specification layer 228. One of skill in the art will understand that each component of FIG. 2 may be understood as modules within a unitary software package, or as discrete software packages integrated to communicate and cooperate in such a manner as to achieve the goals of global automation and testing system.

DevOps solution 202 is a software package for managing artifacts. In some embodiments, artifacts may comprise pieces of software necessary to make software function properly, and may include things such as data models, diagrams, setup scripts, source code, and use cases. One of ordinary skill will understand that other terms, objects, and descriptors within the context of software development likewise qualify as artifacts as used herein. Without proper management of software artifacts, a software package can become messy, disorganized, and unwieldy, to the point that software developers may find it inefficient or ineffectual to debug and further develop a software package. Thus, managing artifacts is crucial to improving productivity across a development ecosystem. In some embodiments, DevOps solution 202 is specifically designed to ensure universal compatibility and integration of artifacts which are otherwise incompatible with one another by converting one or more artifacts into a universally compatible format. In some embodiments, DevOps solution 202 is an end-to-end automation management solution such as JFrog Artifactory. In some embodiments, DevOps solution 202 is an open source software and service solution such as NuGet, allowing developers to share and consume useful code in consolidated compressed files.

Automation layer 210 includes operational framework 220, interface 212, and export data 214. The operational framework 220 uses one or more object definitions 222 and test data 224 to process business functions layer 226. Test data 224 may include various types of data depending on the type of automation testing to be performed by the automation layer 210. By way of non-limiting example, test data 224 may include data for unit testing (e.g., testing the individual components/units of an application), smoke testing (e.g., testing whether or not a software build is stable), functional testing, integration testing, and regression testing. In some embodiments, test data 224 includes a plurality of data types and/or formats to facilitate a comprehensive test of end-to-end automation. A plurality of data types and/or formats may also be preferable in instances where the automation layer 210 conducts cross-platform automation testing.

Business functions layer 226 incorporates a selection of business applications under which a particular automation test may apply, allowing the automation testing system to provide customized automation testing for the particular needs of a business. For example, when used in the banking or financial services industry, business functions layer 226 may include unique scripting to apply automation testing targeting account creation, deposits, withdrawals, loans, overdrafts, fund transfers, mobile payments, cash payments, periodic payments, credit and/or debit card transactions, collections, and portfolio management. One of ordinary skill will understand that additional business functions may be included in the banking or financial services industry, and that business functions layer 226 may include a plurality of other business functions depending on the field or industry in which the automation testing system is utilized.

Script or specification layer 228 enables the operational framework 220 to provide a user with various scripting choices through interface 212 when conducting automation testing. Script or specification layer 228 may include separate scripting to achieve the same automation testing based on the scripting language preferred by the user, as further described below under FIG. 4.

The automation layer 210 outputs data from the operational framework 220 to interface 212, through which a user may select or modify an automation test to be performed by the automation testing system. The interface 212 may include a graphical user interface, command line interface (CLI), or remote agent interface depending on the needs of the automation test user or customer. One of ordinary skill will understand, for example, that a graphical user interface is preferable for untrained employees conducting an in-house automation test, while a command line interface may be preferable when trained developers interact with the system. Likewise, one of ordinary skill will understand that a remote agent interface is preferable in cloud-based automation testing systems or when automation testing is conducted on local servers but initiated remotely by off-site users across a network connection. In some embodiments interface 212 allows a user to select from one or more interface options, giving the automation testing system greater versatility and accessibility across a wider user base.

Figure 3:
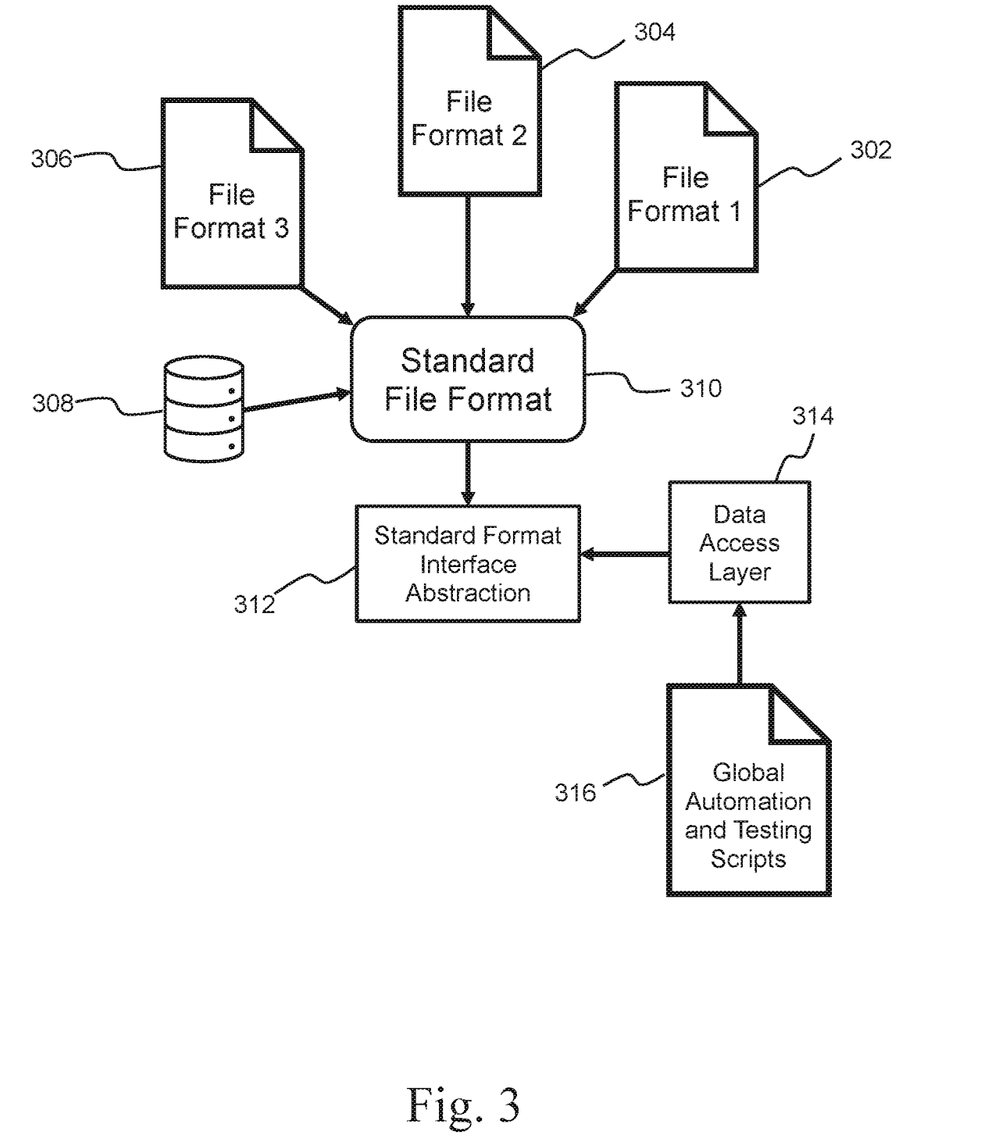
FIG. 3 illustrates a file management system under an embodiment of the present invention.

FIG. 3 illustrates a file management system under an embodiment of the present invention. Data comprising one or more file formats 302, 304, 306 and/or database data 308 is combined and converted to standard file format 310. The standard file format 310 is implemented in standard format interface abstraction 312, which also receives data from global automation and testing scripts 316 through data access layer 314.

The global automation and testing system provides for cross-platform and cross-application compatibility by using standard file format 310. One or more file formats 302, 304, 306 and data from one or more databases 308 correspond to data from automation tools and applications 104 of core framework 100. Because global automation and testing system may interact with one or more tools and applications 104 dealing with different or even incompatible file formats or data types in application-specific libraries 106, the system requires a standard file format 310 for consolidated data processing. This ensures that multiple automation processes can be handled by a unitary system capable of reading and processing the standard file format 310 without requiring less efficient cross-platform conversions for each combination of file or data formats. This is particularly advantageous in industries such as banking or financial services, for example, wherein older legacy software and hardware is often still in use even though companies are also adding new software and hardware to their computerized systems. In some embodiments, standard file format 310 may be in the JavaScript Object Notation syntax (JSON), allowing for lightweight data-interchange and human-readable text as opposed to more sophisticated scripting syntax. This allows the standard file format 310 to be more accessible to users and provides for greater compatibility across a more diverse range of applications, as JSON is a known and common data format in programming implementations. In some embodiments, standard file format 310 may be a YAML or Extensible Markup Language (XML) format.

One of ordinary skill will understand that standard file format 310 may also include other file formats and scripting languages that facilitate consolidation of one or more file and data types and/or scripting languages. In some embodiments, standard file format 310 uses human-readable text to ensure users of the present invention can more readily understand and identify data of interest within system processes. In some embodiments, standard file format 310 uses specialized syntax for more efficient compatibility implementation by trained professionals. In such embodiments, the owner and user of the system may sacrifice readability by a wider audience in favor of scripting efficiency. This is favorable when, for example, the system implementer already has trained professionals who could implement cross-platform compatibility using a specialized standard file format 310 more efficiently than human-readable alternatives.

Figure 4:
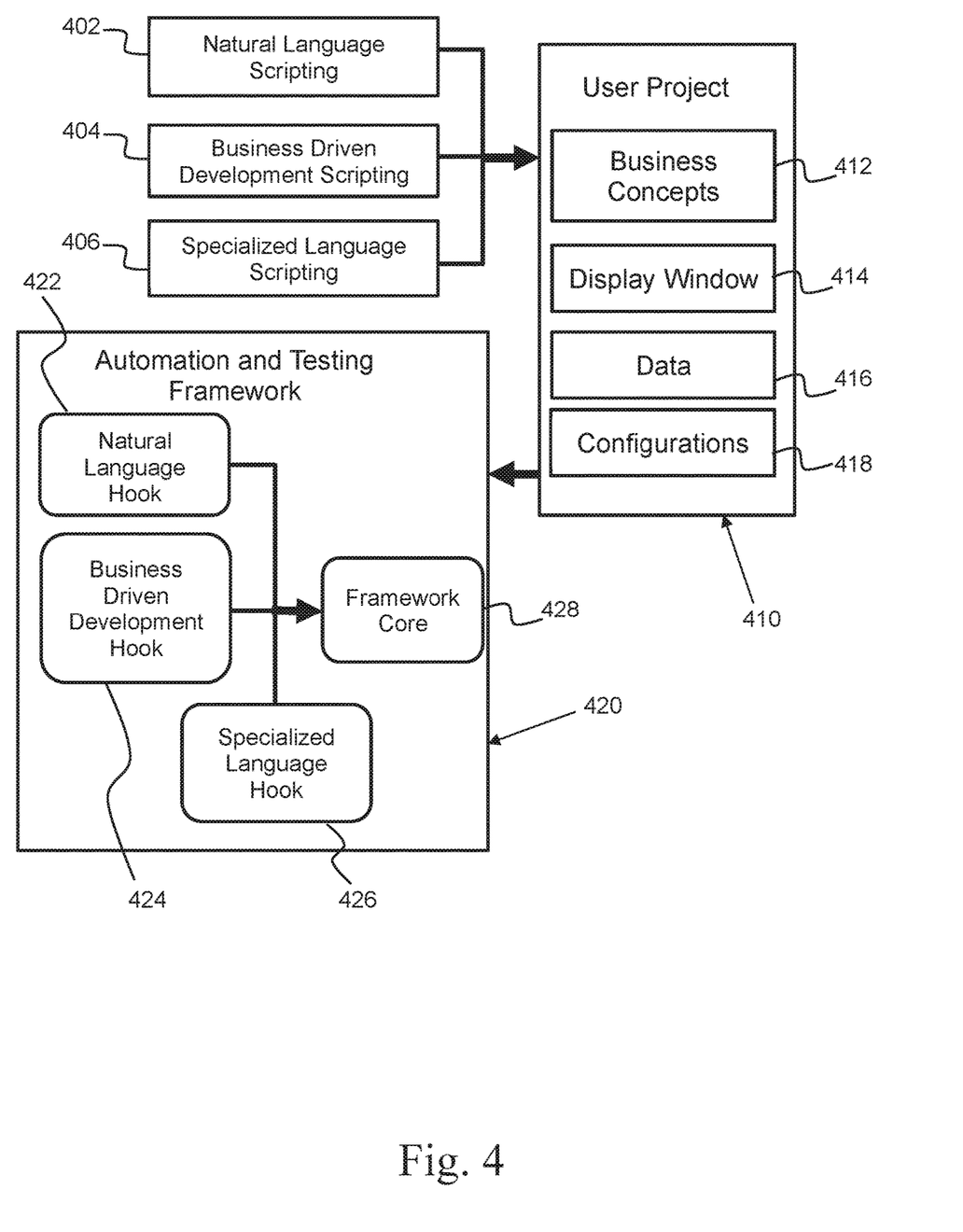
FIG. 4 illustrates a scripting framework under an embodiment of the present invention.

FIG. 4 illustrates a scripting framework under an embodiment of the present invention. In particular, an automation testing system user may use natural language scripting 402, business driven development scripting 404, or specialized language scripting 406 to implement user project 410. The user project includes business concepts 412, display window 414, data 416, and configurations 418. Data 416 and configurations 418 are passed from user project 410 to Global Automation and Testing Framework 420. Global Automation and Testing Framework 420 can then incorporate natural language hook 422, business driven development hook 424, or specialized language hook 426 depending on the user's selection of scripting. The corresponding hook is passed to the framework core 428 to conduct automation testing.

Each of natural language scripting 402, business driven development scripting 404, and specialized language scripting 406 may be included in user project 410 and displayed as selection options to a user through display window 414. A user may select natural language scripting via display window 414. In some embodiments display window 414 corresponds to interface 212 illustrated in FIG. 2. The user inputs additional selections and to the user project, which may include business concepts 412 related to the particular type or types of automation testing the user desires to perform, testing data 416, and configurations 418. The user's selection of natural language scripting is included in configurations 418 of the user project 410. Likewise, in some embodiments, the user's selection of business concepts and other customizable project parameters not shown in FIG. 4 may be incorporated into configurations 418. The user project is executed by passing data 416 and configurations 418 to Global Automation and Testing Framework 420. The natural language hook 422 is selected by virtue of corresponding to the user's selection of natural language scripting 402 incorporated in passed configurations 418. The natural language hook engages framework core 428 to perform automation testing. Framework core 428 may correspond to core framework 100 and then execute analysis and processing as depicted in FIG. 2 and described above, finally resulting in export data 214 describing the results of the particular automation testing conducted.

One of skill in the art will understand that the automation testing process described above when natural language scripting 402 is selected is analogous to the automation testing process when business driven development scripting 404 or specialized language scripting 406 is selected instead. In each instance the user's scripting selection is incorporated in user project 410 and passed to framework core 428 through global automation and testing framework 420 and a corresponding hook 424, 426.

Natural language scripting 402 provides human-readable scripting syntax that is ideal for users untrained in specialized syntax and prioritizes intuitive scripting over efficiency. By providing a user with the ability to select natural language scripting 402, Global Automation and Testing Framework 420 is accessible to a wider variety of users and consumers who may otherwise be unable to conduct automation testing.

Business driven development scripting 404 provides scripting syntax prioritizing the business objectives of a particular script. For example, a user's selection of a business concept 412 within user project 410 may display information related to the selected business concept 412 with corresponding script in display window 414.

Specialized language scripting 406 provides scripting syntax prioritizing scripting efficiently for trained professionals versed in automation testing script languages. Although specialized language scripting 406 may not be readily understood or efficiently used by untrained employees or manual testers, it still represents an efficient option for sophisticated organizations already employing trained automation testers. Many existing languages fit under the description of specialized language scripting 406. By way of non-limiting example, an open source unit testing framework such as NUnit may be used as specialized language scripting 406.

In some embodiments, display window 414 presents a user with a choice regarding scripting prior to inputting or selecting business concepts 412, data 416, and configurations 418. In such embodiments, the user's selection may alter the interface according to the predicted level of training of the user. For example, if a user selects natural language scripting, the automation testing system may hide specialized syntax, substituting the same with natural language alternatives in the display window 414. Likewise, the selection options for business concepts 412 and configurations 418 may appear to the user via display window 414 with summaries, more detailed descriptions, frequently asked questions, or help options. Thus, the system may anticipate the needs of a user based on their selections to provide a more user-friendly and globally accessible automation testing experience. In some embodiments, display window may accept textual script inputs from a user and recommend corresponding or related scripts through a dropdown menu or other visual menu. Likewise, the menu may include recommendations in any or all of the scripting types. One of skill in the art will understand that different business concepts 412 and configurations 418 and/or different information corresponding to the same may be displayed to the user via display window 414 depending on a user's selection of business driven development scripting 404 or specialized language scripting 406. By way of example, a user's selection of specialized language scripting may be indicative of the user's professional training and familiarity with specialized automation testing solutions, and the display window may display data and configurations in a native or raw format.

In some embodiments, each of natural language scripting 402, business driven development scripting 404 and specialized language scripting 406 are selectable within different portions of user project 410. For example, if the user project includes a single automation test in which multiple scripts must be run, the user may select a different or similar scripting 402, 404, 406, for each portion of the automation test. In some embodiments, multiple automation tests can be conducted within a user project, and the user may select different or similar scripting 402, 404, 406 for each automation test. In some embodiments, the display window 414 displays a configuration 418 allowing the user to apply a choice of scripting 402, 404, 406 universally throughout the user project 410.

In some embodiments, a user may populate scripting displayed via display window 414 by selecting a choice of scripting 402, 404, 406 from a drop-down menu. Upon selection, the display window 414 may be populated with pre-stored scripts corresponding to test data 416 and configurations 418 also selected by the user. In some embodiments, the user project may recommend to the user types or formats of data 416 that should be inputted, configurations 418 that should be selected, and scripting 402, 404, 406 that should be chosen based on popularity and/or historical use of selections from previous users. Likewise, the user project may recommend to the user other selections and/or options which are related or are frequently implemented together with inputs already received from the user.

In some embodiments, each of natural language scripting 402, business driven development scripting 404, and specialized language scripting 406 are different in syntax and appearance to a user, but offer equivalent data exported by the framework core 428. In some embodiments, a user's selection of business driven development scripting 404 or specialized language scripting 406 may provide a user with unique automation tests and services commensurate with the script's complexity.

The global automation and testing framework 420 can process various methods of scripting 402, 404, 406 efficiently due to the use of standard file format 310. In particular, the standard file format 310 not only consolidates file formats 302, 304, 306 and database data 308, but also acts as an intermediary between otherwise incompatible methods of scripting 402, 404, 406. The standard file format 310 may be created, updated, and processed throughout the global automation and testing framework under any selected scripting 402, 404, 406. By creating and ensuring compatibility between all file formats and data types with the standard file format 310, the global automation and testing framework streamlines cross-platform compatibility and enables a comprehensive automation testing solution otherwise unavailable in a single automation testing framework.

Automation frameworks often face common types of challenges, including dormant open source libraries, licensing issues, adding new libraries, and improving stored libraries. To ensure the automation framework includes a fully updated, compliant, and functioning library, a full library implementation may need to be re-written entirely. To ensure a re-written library does not interfere with or lack compatibility with user test scripts and other modules, global automation and testing framework 420 may abstract all tool libraries from its implementations. Tools may be abstracted in such a manner that changing a library will not impact a user test project. More specifically, tools and libraries may be stored, referenced, and called out via scripts as separate objects and/or layers. This ensures that modification of a library, and in particular the re-writing of a library, does not adversely affect tools using the library.

Figure 5:
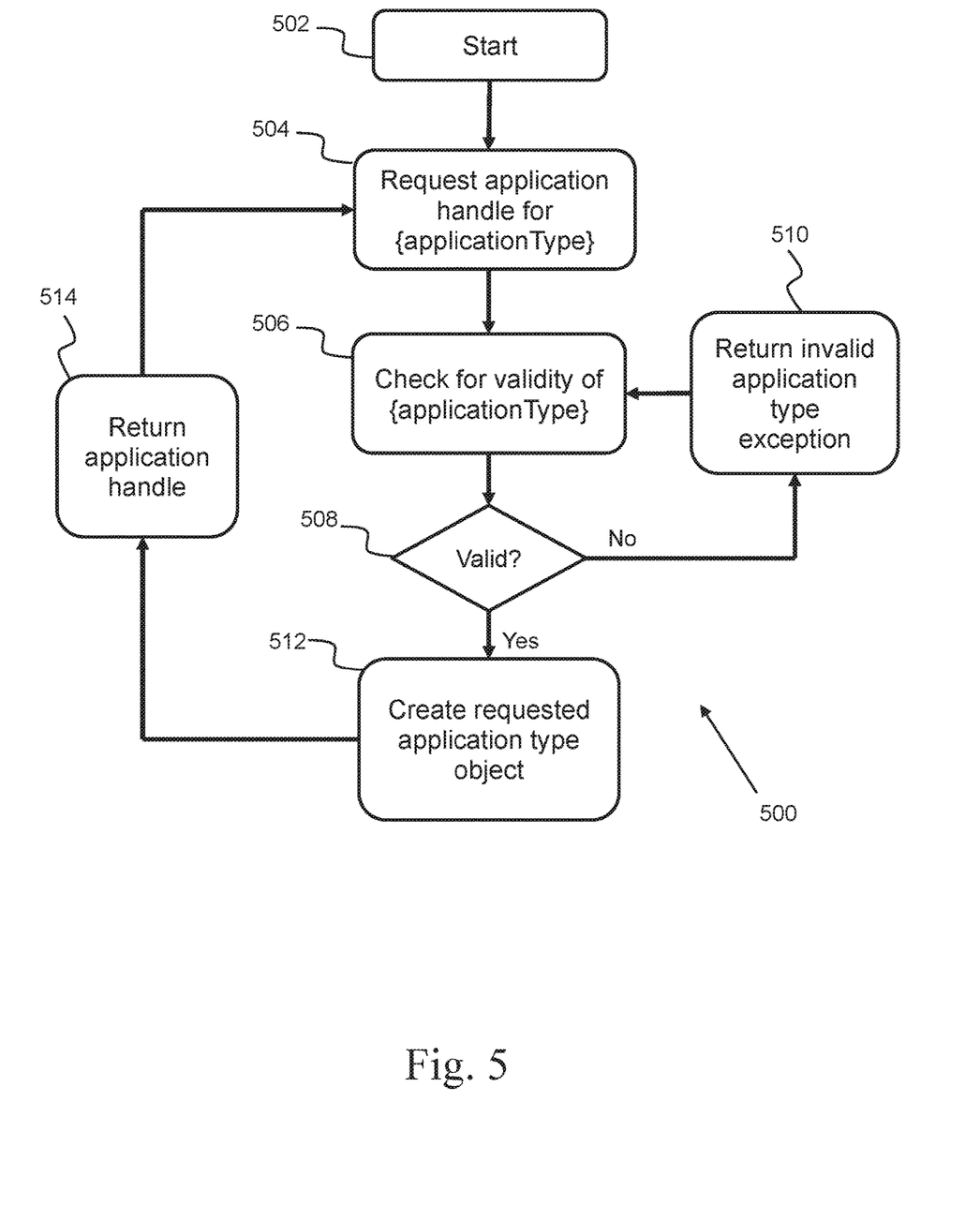
FIG. 5 illustrates a flowchart for calling in a user project under an embodiment of the present invention.

FIG. 5 illustrates a flowchart for calling in a user project under an embodiment of the present invention. Specifically, FIG. 5 illustrates a process by which global automation and testing framework 420 may facilitate library abstraction by creating application type objects. The process depicted and described is implemented in the operational framework 220 of FIG. 2, and may be understood to be part of object definition 222 or implemented in business functions layer 226. First, application handle request process 500 is initiated by a start command 502 within a call-in script. Next, in step 504, the application requests an application handle (depicted, for example only, as having format {applicationType}) from the core framework 100, where the application handle corresponds to an application within a user project. Next, in step 506, the call-in script checks for validity of the application handle. An application handle is valid if it is registered within a memory of the global automation and testing framework core. If the call-in script determines that the application handle is valid during step 508, the call-in script then creates the requested application type object in step 512, and returns application handle 514 in fulfillment of the application's initial request in step 504 so that the application handle may be returned to the user. If the call-in script determines that the application handle is not valid (i.e. is not registered in the global automation and testing framework core) in step 508, the call-in script returns an invalid application type exception in step 510.

In instances where a valid application type is created and returned in application handle request process 500, the application handle is used to invoke execution of applications within core framework 100 related to the registered application handle. Before executing applications within framework core, the application handle must be used to invoke the correct and corresponding tools because tool libraries may be abstracted.

Figure 6:
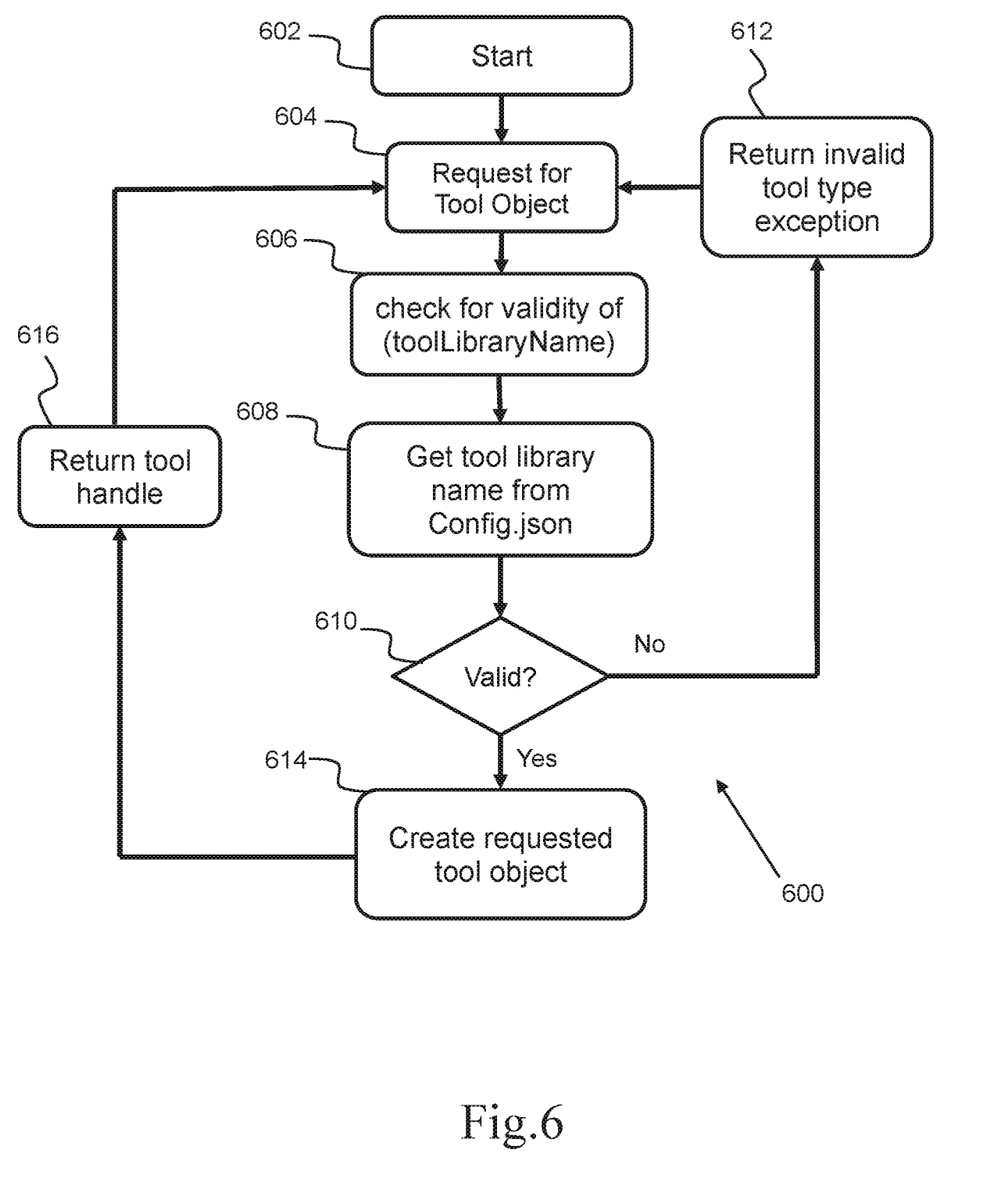
FIG. 6 illustrates a flowchart for tool library abstraction under an embodiment of the present invention.

FIG. 6 illustrates a flowchart for a tool object request process 600. First, the tool object request process 600 is started 602 upon return of a valid handle under application handle request process 500. The process depicted and described is implemented in the operational framework 220 of FIG. 2, and may be understood to be part of object definition 222 or implemented in business functions layer 226. A request for a tool object corresponding to the application handle is made in step 604. Next, the validity of the tool object (depicted, for example only, as having an object name with the format "toolLibraryName") is checked in step 606. To make a determination of tool object validity, a tool name is retrieved in step 608 from the framework core. In some embodiments, the tool name is retrieved from a stored configuration file, such as a JSON file. If the tool object is confirmed to be valid in step 610, a tool object is created in step 614 and a corresponding tool handle is returned, as in step 616. If the tool object is not confirmed to be valid in step 610, then the process may return an invalid tool type exception in step 612. From step 612, the process may go back to step 604 to make a request for a tool object corresponding to the application handle. The operational framework 220 may then use the tool handle to execute the user project 410 as described above in relation to FIGS. 2 and 4. In creating the tool object under step 614, a tool factory stored in core framework 100 may be used which is separate from a stored tool library. The tool factory receives the parameters of the tool library required to execute the user-requested process corresponding to the application handle. The tool library then uses these parameters to initialize a correct and compatible tool library from a pre-stored configuration file. If the tool library is already stored within the framework core, the tool factory may retrieve the stored tool library and return the corresponding tool handle in step 616. If the tool library is not stored within the framework core, the tool factory creates an instance of the tool library corresponding to the parameters and returns the corresponding tool handle in step 616 of FIG. 6.

In embodiments implementing the processes as illustrated in FIGS. 5 and 6, the global automation and testing system has increased flexibility in offering users customizable automation tests. For example, the global automation and testing framework system allows a user to create a customized test without requiring the user to manually change tool libraries or worry about tool library compatibility. Instead, the processes of FIGS. 5 and 6 allow a user to specify a customized type of automation test they wish to conduct, ensuring that the framework returns application and tool handles with properly configured tool libraries corresponding to the user project 410. If the user project includes customized configuration values, these values may be passed as parameters to the tool library to ensure proper update or creation of a customized library compatible with the user project 410. In addition, one of skill in the art will appreciate that tool abstraction and the processes of FIGS. 5 and 6 can be implemented using a variety of data formats and display methods. Because a primary goal of the global automation and testing system is to ensure wide cross-platform and cross-format compatibility, platform and data format configurations may also be passed as parameters to the tool library. Thus, each disclosed process enables abstracted tool libraries to be configured for a particular platform and/or format in each user project and according to every user's preferences.

Figure 7:
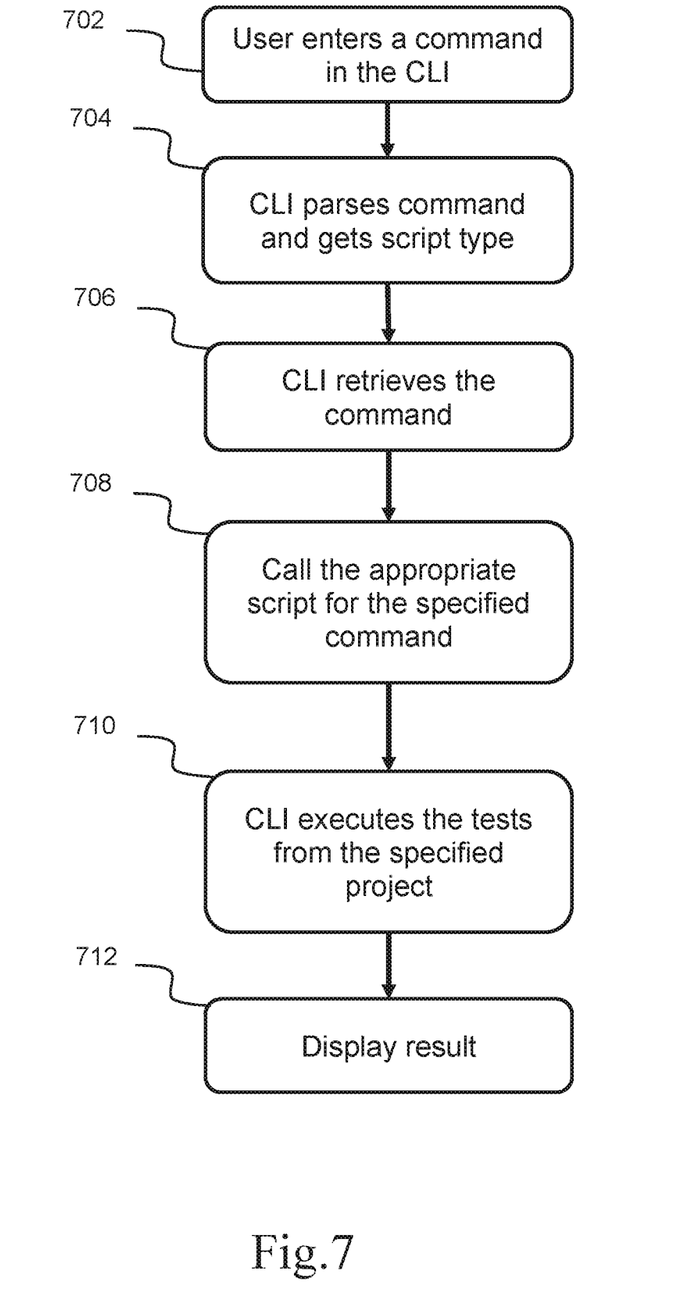
FIG. 7 illustrates a test execution process under an embodiment of the present invention.

FIG. 7 illustrates a test execution process using a command-line interface (CLI) under an embodiment of the present invention. In some embodiments, the CLI corresponds to the display window 414 of FIG. 4. Specifically, the CLI is configured to receive and decipher valid input from a user, regardless of whether the user inputs commands using natural language scripting 402, business driven development scripting 404, or specialized language scripting 406. In first step 702, a user enters a text-based command in the CLI using any preferred type of scripting. The user's command corresponds to a user project the user wishes to execute. Then, in step 704, the CLI parses the command to determine the type of script entered by the user. Next, in step 706, the CLI retrieves the command corresponding to the user's textual input and based on the CLI's determination of script type. In step 708, the CLI calls the appropriate script for executing the specified command. Such scripts may include, for example, the scripts described in tools and applications 104 of FIG. 1 within core framework 100. Next, in step 710, the CLI executes the tests corresponding to the appropriate script determined in step 708 and thus also corresponding to the user's user project 410. Finally, in step 712, the CLI displays the results of the executed tests as requested under the user project.

The CLI using the process shown in FIG. 7 ensures that the global automation and testing system can provide a common user experience across a range of users. It also ensures that the framework can operate efficiently by using a single interface, as opposed to several customized interfaces for each type of script a user may wish to use. The CLI is also advantageous over other interfaces commonly found in prior automation testing frameworks in that a user who knows some commands in one script, but other commands in a different script, does not have to constantly switch between interfaces or between entire frameworks built on only one script type. Instead, such a user may use a single system to complete several user projects, alternating between script types as they please within the same interface.

Figure 8:
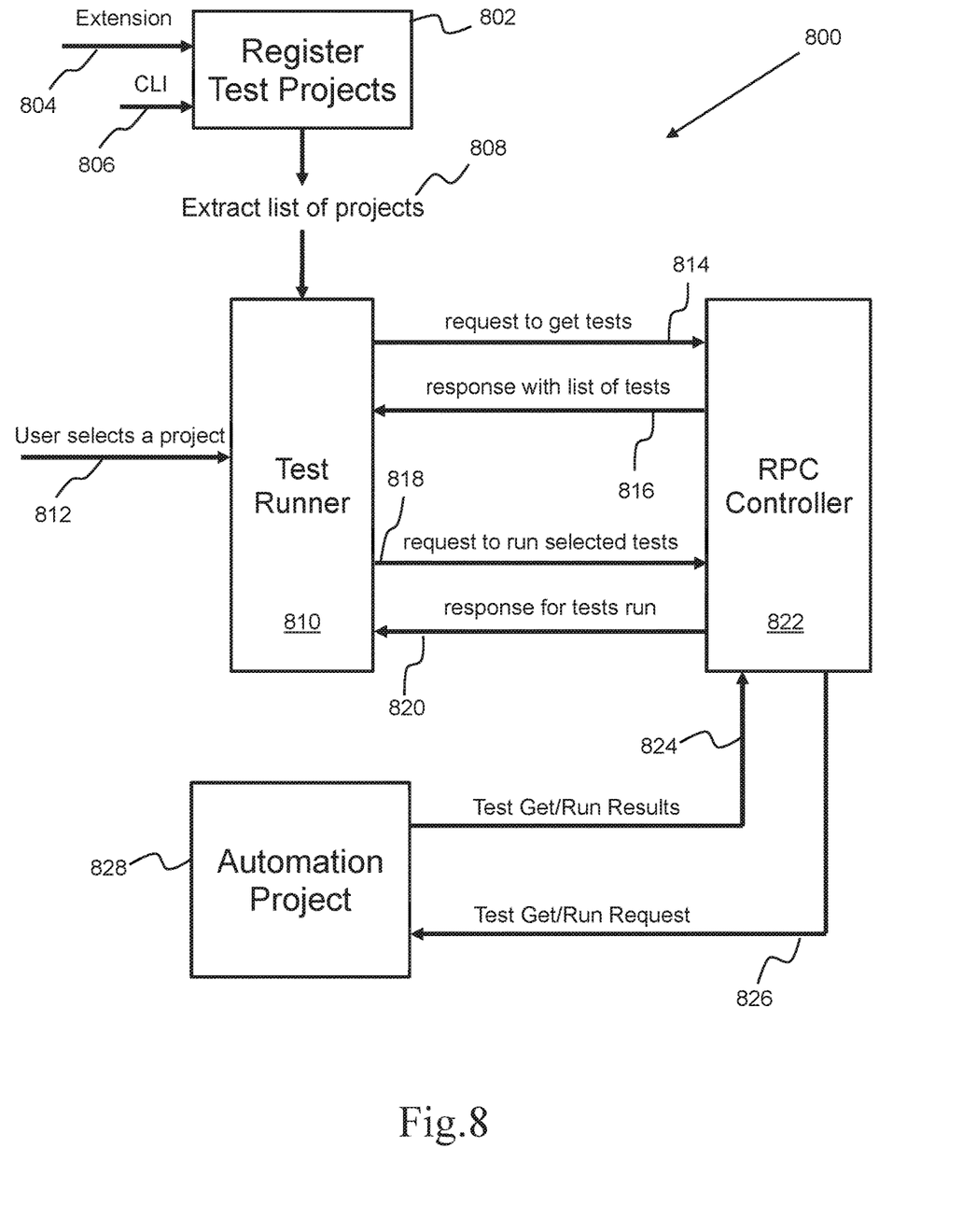
FIG. 8 illustrates a testing architecture under an embodiment of the present invention.

FIG. 8 illustrates a testing architecture under an embodiment of the present invention. Specifically, FIG. 8 illustrates a testing architecture 800 including register test projects 802, test runner 810, Remote Procedure Calls (RPC) Controller 822, and automation project 828. Register Test Projects 802 is representative of data stored in a memory relating to tests a user may include in a user project 410. In some embodiments, register test projects 802 includes test data stored in a register, or temporary storage built into a central processing unit, of a system remote from core framework 100. The test data may include one or more of test names, test handles, test executable scripts, test descriptions, and test parameters. Register test projects 802 are accessed via a CLI 806, such as the CLI described above in relation to FIG. 7, or an extension 804. Extension 804 may be, for example, a program that may be added to external software in order to make the external software compatible with, and able to communicate with, automation and testing framework 420.

Test runner 810 may extract a list of projects 808 from register test projects 802. A user selects a project 812 through test runner 810 from the list of projects extracted from the register test projects 802. Test runner 810 is in communication with RPC controller 822, allowing test runner 810 to transmit requests to get tests 814 to RPC controller 822, receive a response with a list of tests 816 from RPC controller 822, transmit a request to run selected tests 818 to RPC controller 822, and receive a response for tests run 820 from RPC controller 822. RPC controller 822 may transmit a request to get or run tests 826 to automation project 828 and receive results of test retrieval and tests that were run 824 from automation project 828.

The testing architecture 800 illustrated allows global automation and testing framework to transmit test information and execute tests based on the various script types a user may prefer as disclosed above, including natural language scripting 402, business driven development scripting 404, and specialized language scripting 406. For example, an extension 804 may be compatible with only one type of script due to limitations of the external software upon which it is implemented. In such an instance, test runner 810 may interact directly with register test projects 802 as illustrated to ensure compatibility of the extension with the global automation and testing framework 420. Upon a user's selection of a project 812, use of a test runner 810 as an intermediary between a user and RPC controller 822 enables the testing architecture 800 to be cross-platform compatible and also compatible across the various script types. Test runner 810 thus offers a single user interface providing compatibility and translating user inputs for RPC controller 822.

RPC controller 822 enables use of global automation and testing framework 420 remotely. For example, a user may install test runner 810 on an external computer system that is in communication with global automation and testing framework 420 through a network. In some embodiments such a network is a local area network. In some embodiments, the network is wired or wireless network connection via the internet. One of skill in the art will appreciate that an RPC will allow requests to be sent to a known server to execute a specified procedure, such as the procedures described in the present disclosure. In some embodiments, RPC controller 822 includes an open source system, such as gRPC. In some embodiments, RPC controller 822 includes a proprietary or commercially available remote communication protocol.

In some embodiments, automation project 828 represents a user project 410 of FIG. 4. By implementing test runner 810, testing architecture 800 ensures a user's project as conceived by the user and entered into test runner 810 is converted into a compatible format for RPC controller 822. RPC controller 822 then acts as a means for communication between the user project 410 as understood from a frame of reference to automation and testing framework 420.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A method for implementing global automation and testing services comprising:
   extracting a list of projects from a register;
   receiving a first input of a project selection from the list of projects through a command line interface provided via a user interface displayed on a display window;
   parsing the first input through the command line interface to determine a script type of a plurality of script types, wherein the script type comprises one of a natural language script, a business driven development script, or a specialized language script;
   retrieving one or more automation test scripts for performing one of a plurality of automation tests, the one or more automation test scripts corresponding to the determined script type and the first input from an automation test script database;
   after receiving a second input, translating the second input into a standard format compatible with a remote procedure calls (RPC) controller, the RPC controller being configured to provide a list of available automation tests and to request a performing of the plurality of automation tests with a plurality of automation applications;
   prior to the performing of the plurality of automation tests, updating or creating a customized tool library compatible with the first input;
   performing the plurality of automation tests using at least the customized tool library; and
   exporting result test data from the plurality of automation tests in the standard format.

2. The method of claim 1, wherein the natural language script comprises a human readable script.

3. The method of claim 1, wherein the specialized language script is an open source unit testing framework script.

4. The method of claim 1, further comprising: providing the plurality of script types to the user through a drop-down menu within a scripting window of the user interface.

5. The method of claim 1, further comprising: performing an artifact management process on the plurality of automation applications.

6. The method of claim 5, wherein the artifact management process includes converting one or more artifacts to be universally compatible with one another, the one or more artifacts comprising at least one of data models, diagrams, setup scripts, source code, and use cases.

7. A system for implementing global automation and testing services comprising:
   at least one processor; and
   at least one memory storing instructions that, when executed by the at least one processor cause the system to perform operations comprising:
   extracting a list of projects from a register;
   receiving a first input of a project selection from the list of projects through a command line interface provided via a user interface displayed on a display window;
   parsing the first input through the command line interface to determine a script type of a plurality of script types, wherein the script type comprises one of a natural language script, a business driven development script, or a specialized language script;
   retrieving one or more automation test scripts for performing one of a plurality of automation tests, the one or more automation test scripts corresponding to the determined script type and the first input from an automation test script database;
   after receiving a second input, translating the second input into a standard format compatible with a remote procedure calls (RPC) controller, the RPC controller being configured to provide a list of available automation tests and to request a performing of the plurality of automation tests with a plurality of automation applications;
   prior to the performing of the plurality of automation tests, updating or creating a customized tool library compatible with the first input;
   performing the plurality of automation tests using at least the customized tool library; and
   exporting result test data from the plurality of automation tests in the standard format.

8. The system for implementing global automation and testing services of claim 7, wherein the instructions are further configured to cause the system to:
   display, on the display window, automation testing scripts corresponding to the determined script type.

9. The system for implementing global automation and testing services of claim 7, wherein the instructions are further configured to cause the system to:
   provide, through the user interface, one or more business application selections, each business application selection corresponding to configuration data used for performing the plurality of automation tests.

10. The system for implementing global automation and testing services of claim 7, wherein the natural language script is a human-readable script.

11. The system for implementing global automation and testing services of claim 7, wherein the specialized language script is an open source unit testing framework script.

12. The system for implementing global automation and testing services of claim 7, wherein the standard format comprises human-readable text for storing and transmitting object data.

13. The system for implementing global automation and testing services of claim 7, wherein the operations further comprise: prior to receiving the second input, populating the user interface with project parameters having the determined scripting type, wherein the project parameters comprise one or more of business concepts or testing data.

14. The system of claim 7, wherein the operations further comprise: prior to receiving the second input, populating the user interface with recommendations based on popularity or based on previous user selections.

15. The system of claim 7, wherein the RPC controller is further configured to provide the list of available automation tests in response to the first input indicating a selected project.

16. The system of claim 15, the operations further comprising:
determining at least one automation test from the list of available automation tests based on the first input or based on a input; and
sending a request to perform the determined at least one automation test to the RPC controller.

17. The system of claim 7, wherein the operations further comprise: displaying, via the command line interface, the result test data.

18. A non-transitory computer-readable medium storing instructions that, when executed by one or more processors, cause the one or more processors to perform operations for implementing global automation and testing services, the operations comprising:
extracting a list of projects from a register;
receiving a first input of a project selection from the list of projects through a command line interface provided via a user interface displayed on a display window;
parsing the first input through the command line interface to determine a script type of a plurality of script types, wherein the script type comprises one of a natural language script, a business driven development script, or a specialized language script;
retrieving one or more automation test scripts for performing one of a plurality of automation tests, the one or more automation test scripts corresponding to the determined script type and the first input from an automation test script database;
after receiving a second input, translating the second input into a standard format compatible with a remote procedure calls (RPC) controller, the RPC controller being configured to provide a list of available automation tests and to request a performing of the plurality of automation tests with a plurality of automation applications;
prior to the performing of the plurality of automation tests, updating or creating a customized tool library compatible with the first input;
performing the plurality of automation tests using at least the customized tool library; and
exporting result test data from the plurality of automation tests in the standard format.

* * * * *